(12) United States Patent
Schneider

(10) Patent No.: US 6,408,604 B1
(45) Date of Patent: Jun. 25, 2002

(54) HORSE BLANKET WITH RAISED WITHERS PORTION

(76) Inventor: Donald P. Schneider, 26600 George Zeiger Dr. #603, Beachwood, OH (US) 44122

(*) Notice: Subject to any disclaimer, the term of this patent is extended or adjusted under 35 U.S.C. 154(b) by 0 days.

(21) Appl. No.: 09/648,138

(22) Filed: Aug. 25, 2000

(51) Int. Cl.$^7$ ................................................ B68C 5/00
(52) U.S. Cl. ...................................................... 54/79.1
(58) Field of Search ............................... 54/79.1, 79.2, 54/79.3, 79.4

(56) References Cited

U.S. PATENT DOCUMENTS

| | | | |
|---|---|---|---|
| 131,433 A | * | 9/1872 | French ........................ 54/79.2 |
| 448,151 A | | 3/1891 | Kinder |
| 484,996 A | | 10/1892 | Chamberlain |
| 518,833 A | | 4/1894 | Cooper |
| 544,591 A | | 8/1895 | Ransom |
| 581,386 A | * | 4/1897 | Aberson ..................... 54/79.1 |
| 658,894 A | | 10/1900 | Gordon |
| 3,248,852 A | | 5/1966 | Schwartz |
| 3,979,886 A | | 9/1976 | Johnson et al. |
| 5,027,589 A | | 7/1991 | Gleb et al. |
| 5,161,352 A | | 11/1992 | Schneider et al. |
| D383,258 S | | 9/1997 | Curtis |
| 5,782,070 A | | 7/1998 | Knight et al. |
| 5,802,823 A | | 9/1998 | Woods |
| 5,839,395 A | | 11/1998 | Kelley et al. |
| 5,901,532 A | | 5/1999 | Bopp |

FOREIGN PATENT DOCUMENTS

| | | | |
|---|---|---|---|
| FR | 2 570 926 | 4/1986 | |
| GB | 7030 | * 5/1892 | .................. 54/79.2 |
| GB | 18176 | * 11/1894 | .................. 54/79.3 |
| GB | 2 066 636 | 7/1981 | |
| IE | S63196 | 4/1995 | |
| IE | S70233 | 11/1996 | |
| IE | S73427 | 6/1997 | |

OTHER PUBLICATIONS

Schneider Saddlery Co., Inc. Winter/Spring Sale Catalog 1999, 8255 E. Washington St., Chagrin Falls, OH 44023, pp. 2–7.
Schneider Saddlery Co., Inc. 1997–1998 Annual Catalog #150, 8255 E. Washington St., Chagrin Falls, OH 44023, pp. 122–128.

* cited by examiner

Primary Examiner—Robert P. Swiatek

(57) ABSTRACT

A horse blanket includes a panel structure with right and left shoulder portions. The shoulder portions of the panel structure are configured to lie upon a horse's shoulders when the blanket is worn by a horse of a size corresponding to the size of the blanket. A withers portion of the panel structure is configured to have a free-standing condition spaced upward out of overlying contact with the horse's withers when the blanket is thus worn by the horse. This avoids chafing of the withers.

5 Claims, 1 Drawing Sheet

HORSE BLANKET WITH RAISED WITHERS PORTION

FIELD OF THE INVENTION

The present invention relates to a horse blanket, and particularly relates to a blanket that covers the withers of a horse.

BACKGROUND OF THE INVENTION

A horse blanket typically covers the back and sides of a horse from the shoulders to the tail. Some blankets further cover the withers of the horse. However, movement of the horse's neck may cause such a blanket to rub and chafe the withers.

SUMMARY OF THE INVENTION

The present invention is a horse blanket including a panel structure with right and left shoulder portions. The shoulder portions of the panel structure are configured to lie upon a horse's shoulders when the blanket is worn by a horse of a size corresponding to the size of the blanket. A withers portion of the panel structure is located between the shoulder portions. The withers portion is configured to have a free-standing condition spaced upward out of overlying contact with the horse's withers when the blanket is thus worn by the horse. This avoids chafing of the withers.

In the preferred embodiment of the invention, the withers portion of the panel structure comprises a triangular withers panel having two peripheral sides that lie upon the horse at opposite sides of the withers. The withers panel is fixed to the shoulder portions of the panel structure by sewn seams extending along the two peripheral sides of the withers panel. The panel structure in the preferred embodiment further includes right and left side panels which are interconnected, and which define the right and left shoulder portions, respectively.

DESCRIPTION OF A PREFERRED EMBODIMENT OF THE INVENTION

Figure 1:
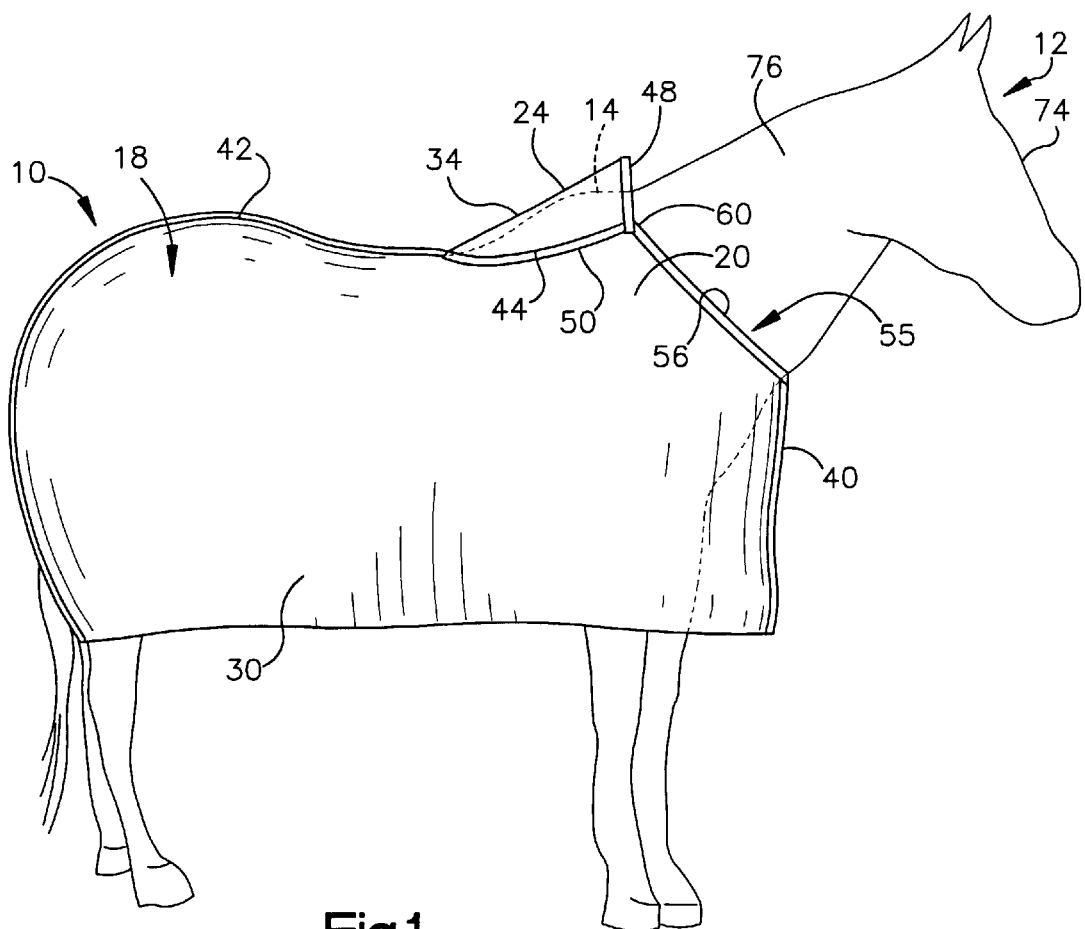
FIG. 1 is a side view of a horse wearing a horse blanket comprising a preferred embodiment of the invention.

A horse blanket 10 comprising a preferred embodiment of the invention is shown in FIG. 1. The blanket 10 is sized to fit a horse 12. Horse blankets typically range in size from sixty to eighty in increments of two. The correct size of the blanket 10 selected for the particular horse 12 is determined by a known method that uses a measurement from the horse's chest to the tail. In accordance with the invention, when the correct size blanket 10 is worn by the horse 12, as shown in FIG. 1, the blanket 10 avoids chafing at the horse's withers 14.

The blanket 10 includes a panel structure 18 with a right shoulder portion 20, a left shoulder portion 22, and a withers portion 24. These portions 20, 22 and 24 of the panel structure 18 in the preferred embodiment are defined by a right side panel 30, a left side panel 32, and a withers panel 34, respectively. The panels 30, 32 and 34 may be quilted, and the panel structure 18 may be equipped with leg straps, belly bands, and/or adjustment straps (not shown) having any suitable configuration known in the art.

Figure 2:
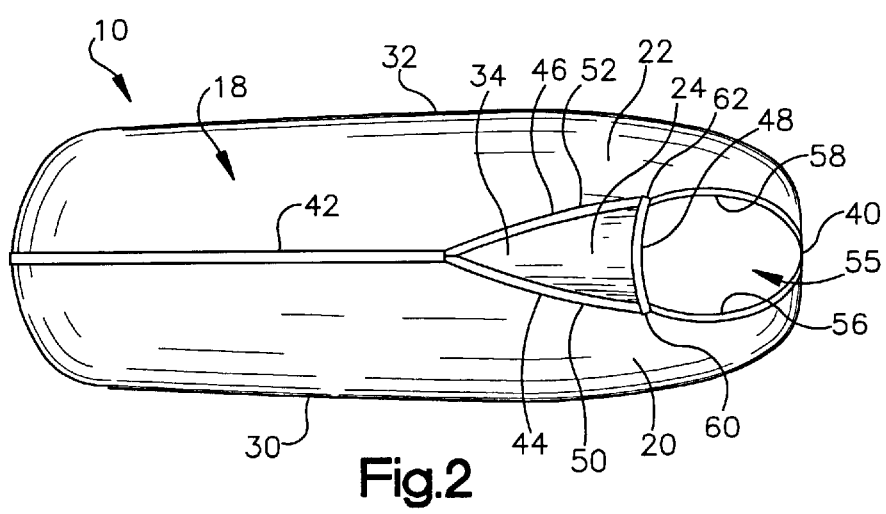
FIG. 2 is a top view of the horse blanket of FIG. 1.

The side panels 30 and 32 are alike and are sewn together along front and back seams 40 and 42. The withers panel 34 has a triangular periphery with a right side 44, a left side 46, and a base 48. As shown in FIG. 2, the right and left sides 44 and 46 of the withers panel 34 are sewn to the right and left side panels 30 and 32 along seams 50 and 52, respectively, that diverge from the back seam 42. A neck opening 55 for the horse 12 is defined in part by the base 48 of the withers panel 34, and in part by free edges 56 and 58 of the side panels 30 and 32 that upward and rearward from the front seam 40 to the opposite ends 60 and 62 of the base 48.

The shoulder portions 20 and 22 of the panel structure 18 lie upon the horse's shoulders. However, the withers portion 24 is raised above the horse's withers 14. Specifically, the width of the withers panel 34, as measured between its opposite sides 44 and 46, is great enough to impart a tent-like configuration such that the withers panel 34 spans the space between the side panels 30 and 32 over and above the horse's withers 14. This condition preferably exists fully throughout the length of the withers panel 34 from the back seam 42 to the neck opening 55. As a result, the horse 12 bears the weight of the panel structure 18 directly beneath the shoulder portions 20 and 22 and the seams 50 and 52 that adjoin the shoulder portions 20 and 22, but not directly beneath the withers portion 24. The withers portion 24 of the panel structure 18, which in the preferred embodiment is coextensive with the withers panel 34, thus has a free-standing condition in which it is spaced upward out of overlying contact with the horse's withers 14 to avoid chafing at the withers 14. This can be especially beneficial when the horse 12 lowers its head 74 and neck 76 to eat or drink, because such movement of the neck 76 tends to move the withers 14 upward relative to the shoulders 70 and 72.

The invention has been described with reference to a preferred embodiment. Those skilled in the art will perceive improvements, changes and modifications. Such improvements, changes and modifications are intended to be within the scope of the claims.

What is claimed is:

1. A horse blanket comprising:

a panel structure having right and left shoulder portions configured to lie upon a horse's shoulders when said blanket is worn by a horse of a size corresponding to the size of said blanket;

said panel structure further having a withers portion between said shoulder portions, said withers portion being configured to have a free-standing condition spaced upward out of overlying contact with the horse's withers when said blanket is thus worn by the horse, whereby said blanket avoids chafing of the withers;

wherein said withers portion of said panel structure comprises a triangular withers panel.

2. A horse blanket as defined in claim 1 wherein said triangular withers panel has two peripheral sides configured to lie upon the horse at opposite sides of the withers when said blanket is thus worn by the horse.

3. A horse blanket as defined in claim 2 wherein said triangular withers panel is attached to said shoulder portions of said panel structure at said two peripheral sides of said triangular withers panel.

4. A horse blanket as defined in claim 3 wherein said triangular withers panel fixed to said shoulder portions of said panel structure by sewn seams extending along said two peripheral sides of said triangular withers panel.

5. A horse blanket as defined in claim 4 wherein said panel structure includes right and left side panels which are interconnected and which define said right and left shoulder portions, respectively.

* * * * *